United States Patent Office 3,047,708
Patented July 31, 1962

3,047,708
ELECTRIC ARC WELDING METHOD
Louis E. Stark, Youngstown, Ohio, assignor to Union Carbide Corporation, a corporation of New York
No Drawing. Original application Dec. 12, 1957, Ser. No. 702,235. Divided and this application Dec. 18, 1959, Ser. No. 860,360
3 Claims. (Cl. 219—74)

This invention relates to a welding flux powder and more particularly to an essentially non-magnetic welding flux powder with a magnetic coating especially suited for use in gas shielded, consumable electrode arc welding and to a method of producing same.

This application is a division of my co-pending application Serial No. 702,235 filed December 12, 1957.

The term "magnetic material" as used herein is intended to apply to a material which is attracted to a magnet or especially to a wire electrode having a surrounding magnetic field created by an electric current flowing through the wire. A non-magnetic material herein is one which is substantially not attracted by a magnetic flux field. Magnetization as used herein means the attachment to normally non-magnetic powder particles of a magnetic component.

In electric arc welding wherein an alloy weld metal is produced on a metal workpiece by means of a gas shielded, bare, consumable electrode and a magnetic alloy powder, the magnetic alloy powder is prepared by mixing the crushed alloy powder in a desired composition ratio with a suitable amount of magnetic powder, such as iron, nickel or cobalt. Bonding of the mixture is generally accomplished with sodium silicate solution followed by drying and recrushing.

While the aforesaid magnetic alloy powder is for the most part satisfactory, problems have arisen in powders so formed. In many instances, careful recrushing of the bonded mixture is necessary in order to assure that all the agglomerate particles contain sufficient magnetic material. Otherwise, the particles fall free of the electrode out of the weld zone, or enter the outer edges of the weld puddle without sufficient time for complete solution in the weld. The loss of these powder particles reduces the recovery of alloy in the weld deposit. In addition, the sodium silicate, which is not assimilated in the weld metal causes the formation of surface splinters or shards which detract from the appearance of the weld.

It is, therefore, an important object of the present invention to provide an economical method of rendering a non-magnetic material magnetic.

Another object is to provide an improved electric arc welding powder containing a magnetic component in the particles thereof.

Another object of the present invention is to provide an improved electric arc welding powder capable of being used in the standard magnetic coating welding processes, such as "Unionarc" and "Sigmaloy" welding processes, the powder comprising non-magnetic particles having magnetic coatings.

Another object of the present invention is to provide an improved welding powder capable of producing on a metal workpiece a weld deposit having essentially the same properties as a weld deposit made from sodium silicate bonded powders, yet producing a weld free of surface blemishes.

Another object of the present invention is to provide an improved welding powder wherein the need for the slag or gas-forming constituents of a binder and the need for subsequent recrushing and sizing operations are substantially reduced or eliminated.

Another object of the present invention is to provide in the incorporation of powder in the weld metal in fusible electrode arc welding, an improved method for adding non-magnetic material without loss.

The present invention is based on my discovery that non-magnetic powders may be made magnetic by plating or coating with a magnetic material. The non-magnetic materials include powdered fluxing ingredients, powdered metal or alloying mixtures substantially free of fluxing ingredients, or any combination thereof.

In accordance with my invention, magnetization of a non-magnetic, welding powder material is accomplished by plating the non-magnetic material with a thin coating of a magnetic material. Among the magnetic coating materials which have proved satisfactory are iron, cobalt and nickel. These coating materials may also serve as specific metal additives to the weld. Economic considerations make iron the most desirable of these. For satisfactory results the coating materials should be present at least in an amount between about 3.5 percent and 10 percent by weight of welding powder, depending, of course, upon the specific coating material employed.

Any of a number of non-magnetic or slightly magnetic powdered metal constituents may be used as core particles in the magnetic welding powder of the invention. Elements such as aluminum, chromium, manganese, silicon, carbon, tungsten, molybdenum, columbium, magnesium, and copper are conventional ingredients in welding powders. Alloying ingredients such as high carbon ferrochromium, low carbon ferrochromium, ferromanganese, ferrosilicon, ferrotungsten, graphite and tungsten carbide have also proved useful as core ingredients in the invention.

The coated magnetic powder embodying the principles of the invention may be made by suitably comminuting the desired non-magnetic ingredients to approximately $35 \times D$ mesh size (i.e., capable of passing through a screen having 0.417 mm. openings), and then immersing the comminuted ingredients into an electrolyte solution to be electroplated in the usual manner. The electrolyte solution is provided with conventional cathode and anode electrodes connected to a source of power, a suitable anode being employed to replace the iron, nickel, or cobalt ions which serve to plate the surfaces of the non-magnetic powders. A preferred electrolyte is ferrous chloride, and a preferred anode is iron. Thereafter a suitable voltage is impressed across the solution for a sufficient length of time to satisfactorily coat the comminuted ingredients.

In order to indicate still more fully the nature of the present invention, the following typical example of the invention is set forth, it being understood that the data presented therein are illustrative only, and not intended to limit the scope of the invention.

*Example*

Six hundred ninety-three grams of high carbon chromium powder comminuted to approximately 35 x 325 mesh size (i.e., capable of passing through a screen having 0.417 mm. openings but being retained on a screen having 0.43 mm. openings), was electroplated with iron in 2900 cc. of an aqueous solution containing 968 grams of ferrous chloride ($FeCl_2 \cdot 4H_2O$) and 975 grams of calcium chloride ($CaCl_2$). Electroplating was conducted at from 6½ to 9 volts at a current of 46 amperes for 230 ampere hours. The weight of the granular material increased from 693 grams to 911.8 grams due to the iron coating formed on the discrete particles. Analysis of the powdered material before and after electroplating was, as follows:

|  | Before | After |
|---|---|---|
| Cr, percent | 90.22 | 65.77 |
| C, percent | 8.78 | 6.40 |
| Fe, percent | 0.35 | 26.47 |

In welding according to the teaching of the invention, essentially no powder loss occurred due to the powder particles being individually magnetic. Chemical analysis of weld deposits showed very good alloy recovery. In addition, welds made with the welding powder of the invention were free of surface slag and had good edges and contours.

From the foregoing description, it will be apparent to those skilled in the art that the invention provides a novel magnetic welding powder, the particles of which have a core of substantially non-magnetic material and a coating of a magnetic material. The magnetic powder of the invention is eminently suited to use in electric arc welding of the Unionarc and Sigmaloy welding type, which the adherence of a metal powder or a fluxing powder to bare wire electrode, due to the magnetizable property of the powder and the magnetic field surrounding the electrode, is required. Further, it will be evident that the invention encompasses a number of combinations and that those specifically discussed herein are described for purposes of illustrating the principles of the invention and not for limiting its scope.

It will be understood that modifications and variations may be effected without departing from the spirit and scope of the invention.

What is claimed is:

1. An electric arc welding method in which a consumable electrode is connected to a source of welding current which comprises: advancing the consumable electrode toward a workpiece, passing a welding current through the electrode to establish a magnetic flux thereabout and to form an electric arc at the workpiece, directing a stream of shielding gas along the electrode and towards the said arc, feeding toward said electrode a powdered welding material composed of particles of a non-magnetic welding material having on the outer surface thereof a coating consisting of a layer of a magnetic metal whereby said powdered welding material will be magnetically drawn to the electrode and conveyed thence to the weld area as the electrode is advanced thereto.

2. An electric arc method substantially as described in claim 1 wherein the powdered welding material consists of particles of at least one of the materials chosen from the group consisting of high carbon ferrochromium, low carbon ferrochromium, ferromanganese, ferrosilicon, ferrotungsten, graphite and tungsten carbide, said particles having an outer layer consisting of a coating of a magnetic metal chosen from the group consisting of iron, cobalt, and nickel.

3. An electric arc welding method in which a consumable electrode is connected to a source of welding current which comprises: advancing the consumable electrode toward a workpiece, passing a welding current through the electrode to establish a magnetic field thereabout and to form an electric arc with the workpiece, directing a stream of shielding gas along the electrode and toward the said arc, feeding toward the electrode a powdered welding flux composed of coated particles of at least one non-magnetic welding flux material from the group consisting of aluminum, chromium, manganese, silicon, carbon, tungsten, molybdenum, columbium, magnesium, and copper, said particle having as an outer layer a coating of a magnetic metal from the group consisting of iron, cobalt, and nickel whereby said coated particle will be magnetically drawn to the electrode and conveyed thence to the workpiece.

References Cited in the file of this patent

UNITED STATES PATENTS

| 2,003,040 | Strobel | May 28, 1935 |
| 2,021,040 | Zublin | Nov. 12, 1935 |
| 2,507,400 | Marinis | May 9, 1950 |
| 2,644,787 | Bonn et al. | July 7, 1953 |
| 2,805,323 | Cushman | Sept. 3, 1957 |
| 2,868,949 | Todd | Jan. 13, 1959 |
| 2,947,847 | Craig et al. | Aug. 2, 1960 |
| 2,948,803 | Wilson et al. | Aug. 9, 1960 |